US011507616B2

(12) United States Patent
Liu et al.

(10) Patent No.: US 11,507,616 B2
(45) Date of Patent: Nov. 22, 2022

(54) INSPECTION SYSTEMS AND METHODS INCLUDING IMAGE RETRIEVAL MODULE

(71) Applicant: General Electric Company, Schenectady, NY (US)

(72) Inventors: Shaopeng Liu, Clifton Park, NY (US); Xiao Bian, Santa Clara, CA (US); Yan Liu, Guilderland, NY (US); Feng Xue, Clifton Park, NY (US); Walter Vincent Dixon, III, Duanesburg, NY (US); Mark Richard Gilder, Clifton Park, NY (US); Peihong Zhu, Clifton Park, NY (US); Bernard Patrick Bewlay, Niskayuna, NY (US); Byron Andrew Pritchard, Cincinnati, OH (US); Masako Yamada, Niskayuna, NY (US); Colin James Parris, Brookfield, CT (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 17/011,912

(22) Filed: Sep. 3, 2020

(65) Prior Publication Data
US 2022/0067083 A1 Mar. 3, 2022

(51) Int. Cl.
G06F 16/583 (2019.01)
G06N 3/04 (2006.01)
(Continued)

(52) U.S. Cl.
CPC .......... *G06F 16/583* (2019.01); *G06F 16/152* (2019.01); *G06F 16/51* (2019.01); *G06N 3/0454* (2013.01)

(58) Field of Classification Search
CPC .................................................. G06N 3/0454
See application file for complete search history.

(56) References Cited

U.S. PATENT DOCUMENTS 8,331,650 B2  12/2012  Yuan et al.
8,345,982 B2   1/2013  Gokturk
(Continued)

FOREIGN PATENT DOCUMENTS

CN  105260412 A   1/2016
CN  107229757 A  10/2017
(Continued)

OTHER PUBLICATIONS

Norouzi et al., "Hamming Distance Metric Learning", Advances in Neural Information Processing Systems 25 (NIPS 2012), pp. 1-9, 2012.
(Continued)

Primary Examiner — Edward Park
(74) Attorney, Agent, or Firm — Fitch, Even, Tabin & Flannery LLP

(57) ABSTRACT

A method of inspecting a component includes storing at least one inspection image file in a memory and receiving a search request associated with the at least one inspection image file. The method also includes accessing a database including a plurality of image files, comparing the hash code of the at least one inspection image file to the hash code of each image file of the plurality of image files, and identifying a first subset of image files based on the hash code comparison. The method also includes comparing the feature data of the at least one inspection image file to the feature data of each image file of the first subset of image files and classifying a second subset of image files as relevant based on the feature data comparison. The method further includes generating search results based on the second subset of image files.

20 Claims, 4 Drawing Sheets

(51) Int. Cl.
*G06F 16/14* (2019.01)
*G06F 16/51* (2019.01)

(56) References Cited

U.S. PATENT DOCUMENTS

| | | | |
|---|---|---|---|
| 8,792,705 | B2 | 7/2014 | Scheid et al. |
| 9,424,277 | B2 | 8/2016 | Retterath |
| 9,542,405 | B2 | 1/2017 | Park |
| 10,223,610 | B1 | 3/2019 | Akselrod-Ballin |
| 10,289,702 | B2 | 5/2019 | Drake |
| 10,467,502 | B2 | 11/2019 | Ren et al. |
| 10,475,174 | B2 | 11/2019 | Lim et al. |
| 2017/0316287 | A1 | 11/2017 | Mu |
| 2017/0343481 | A1 | 11/2017 | Jahanshahi et al. |
| 2019/0080446 | A1 | 3/2019 | Kuzmin et al. |
| 2019/0303717 | A1 | 10/2019 | Bhaskar et al. |
| 2019/0304077 | A1 | 10/2019 | Wang et al. |
| 2020/0154165 | A1* | 5/2020 | Cohen ............ G06V 20/49 |
| 2022/0067082 | A1 | 3/2022 | Bian |

FOREIGN PATENT DOCUMENTS

| | | |
|---|---|---|
| CN | 106227851 B | 10/2019 |
| CN | 110297931 A | 10/2019 |

OTHER PUBLICATIONS

Jing et al., "Visual Search at Pinterest", In Proceedings of the 21st ACM SIGKDD International Conference on Knowledge and Discovery and Data Mining, 2015, vol. 1, pp. 1-10, May 28, 2015.

Babenko et al., "Aggregating Deep Convolutional Features for Image Retrieval", ICCV 2015, pp. 4321-4329, Oct. 26, 2015.

Ri-Xian et al., "Defects Detection Based On Deep Learning and Transfer Learning", Metallurgical and Mining Industry, pp. 312-321, Nov. 7, 2015.

Park et al., "Machine Learning-Based Imaging System for Surface Defect inspection", International Journal of Precision Engineering and Manufacturing—Green Technology, vol. 3, Issue: 3, pp. 303-310, Jul. 2016.

Covington et al., "Deep Neural Networks for YouTube Recommendations", Proceedings of the 10th ACM Conference on Recommender Systems, pp. 191-198, Sep. 15-19, 2016.

Weimer et al., "Design of Deep Convolutional Neural Network Architectures for Automated Feature Extraction in Industrial Inspection", CIRP Annals, vol. 65, Issue: 1, pp. 417-420, 2016.

Cao et al., "Deep Cauchy Hashing for Hamming Space Retrieval", 2018 IEEE/CVF Conference on Computer Vision and Pattern Recognition, pp. 1229-1237, Salt Lake City, USA, Jun. 18-23, 2018.

Hsieh et al., "Learning to Decompose and Disentangle Representations for Video Prediction", 32nd Conference on Neural Information Processing Systems (NeurIPS 2018), pp. 1-10, Canada, 2018.

Guo et al., "Region Annotations in Hashing Based Image Retrieval", ICIMCS '14 Proceedings of International Conference on Internet Multimedia Computing and Service, pp. 1-4, Jul. 10-12, 2014.

Zhou et al., "Recent Advance in Content-Based Image Retrieval: A Literature Survey", Multimedia (cs.MM); Information Retrieval (cs.IR), pp. 01-22, Sep. 2, 2017.

Bai et al., "Deep Progressive Hashing for Image Retrieval", IEEE Transactions on Multimedia, vol. 21, Issue: 12, pp. 3178-3193, Dec. 2019.

\* cited by examiner

INSPECTION SYSTEMS AND METHODS INCLUDING IMAGE RETRIEVAL MODULE

BACKGROUND

The field of the disclosure relates generally to systems and methods of inspecting a component, and more particularly, to systems and methods of inspecting a component using an image retrieval module.

Components are inspected using inspection systems at various stages of manufacture or use to obtain information regarding the components' current state and potential operational life. For example, in at least some known inspection systems, users analyze images of the components to identify features or anomalies such as defects, material wear, and damage. However, the users are not always able to accurately, consistently, and reliably analyze the images. Accordingly, at least some known inspection systems utilize a database of image files to assist the user in inspecting the components. However, such inspection system must process each image file in the database to find relevant image files during a retrieval process. As a result, the time required to inspect the components is increased because the inspection system must spend time analyzing each image file in the database. Moreover, at least some of the image files retrieved from the database may be irrelevant and obscure any useful information that is provided.

Accordingly, there is a need for inspection systems that are able to filter and sort image files in a database and retrieve image files from the database that are relevant for an inspection image file.

BRIEF DESCRIPTION

In one aspect, a method of inspecting a component using an image inspection controller that includes a processor communicatively coupled to a memory and configured to operate in accordance with an image retrieval module is provided. The method includes storing at least one inspection image file in the memory and receiving a search request associated with the at least one inspection image file. The at least one inspection image file includes a hash code, feature data, and image data. The method also includes accessing a database including a plurality of image files. Each image file of the plurality of image files includes a hash code, feature data, and image data. The method further includes comparing the hash code of the at least one inspection image file to the hash code of each image file of the plurality of image files and identifying a first subset of the plurality of image files based on the comparison of the hash code of the at least one inspection image file and the hash code of each image file of the plurality of image files. The method also includes comparing the feature data of the at least one inspection image file to the feature data of each image file of the first subset of the plurality of image files and classifying a second subset of the plurality of image files as relevant based on the comparison of the feature data of the at least one inspection image file and the feature data of each image file of the first subset of the plurality of image files. The method further includes generating search results based on the second subset of the plurality of image files.

In another aspect, a system for inspecting a component is provided. The system includes at least one memory including a database storing a plurality of image files. Each image file of the plurality of image files includes a hash code, feature data, and image data. The system also includes at least one processor configured to access the at least one memory and operate in accordance with a retrieval module. The at least one processor is programmed to store at least one inspection image file in the memory. The at least one inspection image file includes a hash code, feature data, and image data. The at least one processor is further programmed to receive a search request associated with the at least one inspection image file. The at least one processor is also configured to compare the hash code of the at least one inspection image file to the hash code of each image file of the plurality of image files and identify a first subset of the plurality of image files based on the comparison of the hash code of the at least one inspection image file and the hash code of each image file of the plurality of image files. The at least one processor is further configured to compare the feature data of the at least one inspection image file to the feature data of each image file of the first subset of the plurality of image files and classify a second subset of the plurality of image files as relevant based on the comparison of the feature data of the at least one inspection image file and the feature data of each image file of the first subset of the plurality of image files. The at least one processor is also configured to generate search results based on the second subset of the plurality of image files.

In yet another aspect, a retrieval module for identifying at least one feature in at least one image of a component is provided. The retrieval module is configured to cause a processor to store at least one inspection image file in a memory and receive a search request associated with the at least one inspection image file. The at least one inspection image file includes a hash code, feature data, and image data. The retrieval module is also configured to cause the processor to access a database including a plurality of image files. Each image file of the plurality of image files includes a hash code, feature data, and image data. The retrieval module is also configured to cause the processor to compare the hash code of the at least one inspection image file to the hash code of each image file of the plurality of image files and identify a first subset of the plurality of image files based on the comparison of the hash code of the at least one inspection image file and the hash code of each image file of the plurality of image files. The retrieval module is further configured to cause the processor to compare the feature data of the at least one inspection image file to the feature data of each image file of the first subset of the plurality of image files, and classify a second subset of the plurality of image files as relevant based on the comparison of the feature data of the at least one inspection image file and the feature data of each image file of the first subset of the plurality of image files. The retrieval module is also configured to cause the processor to generate search results based on the second subset of the plurality of image files.

DRAWINGS

These and other features, aspects, and advantages of the present disclosure will become better understood when the following detailed description is read with reference to the accompanying drawings in which like characters represent like parts throughout the drawings, wherein.

Figure 1:
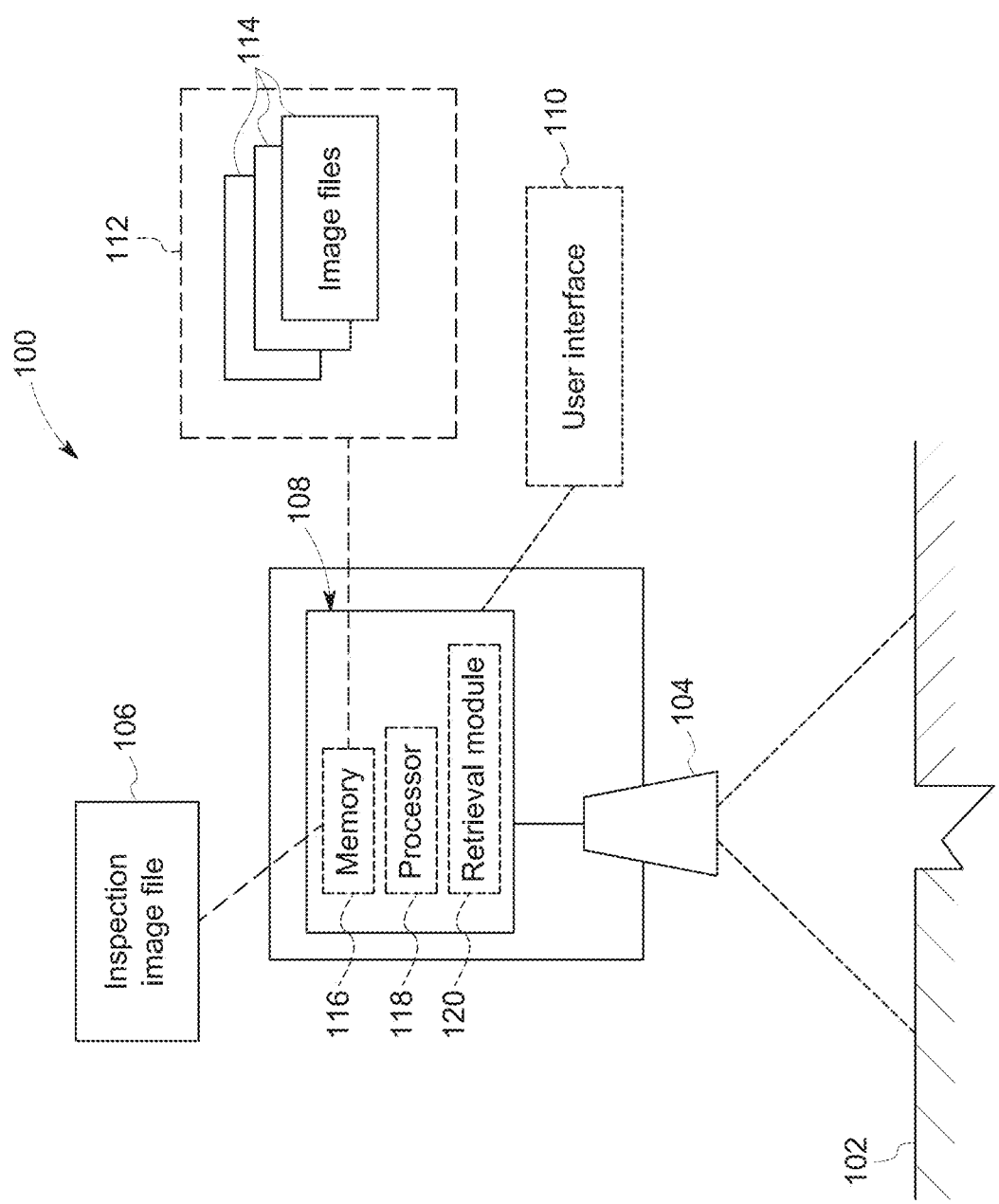
FIG. 1 is a schematic diagram of a system for inspecting a component.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the terms "anomaly" and "anomalies" refer to areas of variation within a component. Areas of variation include, for example and without limitation, defects, dislocations, cracks, wear, voids, deformations, stress concentrations, disruptions, fissures, inclusion of foreign particles, and corrosion.

The disclosure includes systems and methods for inspecting a component. The systems and methods described herein include a retrieval module configured to analyze at least one inspection image file of the component and retrieve image files from a database to assist in analyzing the inspection image file. The retrieval module utilizes metadata of the image files to identify potentially relevant image files in the database and sort the image files. For example, the retrieval module compares a hash code of the inspection image file to hash codes of each image file in the database and identifies a first subset of image files from the database as potentially relevant based on the hash code comparison. Accordingly, the retrieval module is able to focus on the first subset of image files during in-depth analysis and ignore other image files in the database that are unlikely to be relevant. After hash code filtering, the retrieval module compares feature data of the inspection image to feature data of each image file in the first subset and classifies a second subset of the image files from the database as relevant. As a result, the systems and methods described herein are able to more quickly and accurately retrieve relevant image files from a database than at least some known inspection systems.

The systems and methods described herein utilize self-learning to increase the accuracy of the classification process. For example, the retrieval module recognizes hash codes and feature data from previous searches when comparing the inspection image files and the image files in the database and utilizes historical information to classify the hash code and feature data of the searched image files. For example, the retrieval module can recognize that a hash code from a previous search was associated with an image file that was classified as relevant or not relevant and classify the searched image file accordingly. As a result, the retrieval module is able to more quickly and accurately classify the image files. Moreover, the retrieval module may learn to identify and classify anomalies shown in the inspection image files at least partly autonomously and, therefore, decrease errors and inconsistencies of at least some human inspections.

The systems and methods described herein include a user interface that allows a user to generate a search request based on at least one inspection image and view an inspection report based on the search request. In some embodiments, the inspection report includes information relating to image files from the database that are classified as relevant. For example, the inspection report may include treatment decisions or historical outcomes for regions of interest or anomalies similar to the searched image file. As a result, the user interface highlights relevant information for the user that can increase the accuracy and reliability of the current inspection and provides context to the user on how similar anomalies were treated in the past and/or outcomes for the anomalies.

FIG. 1 is a schematic diagram of a system 100 for inspecting a component 102. System 100 includes a camera 104 configured to capture at least one inspection image file 106 of component 102, a controller 108 communicatively coupled to camera 104, and a user interface 110 configured to receive user inputs and/or display information for a user. In particular, in the exemplary embodiment, user interface 110 is configured to enable a user to provide inspection image files 106 captured by camera 104 and/or a camera external to system 100. Image files 106 may include videos, photographs, drawings, and any other visual representation of an object. In some embodiments, controller 108 is configured to receive inspection image files 106 from camera 104 and identify at least one feature of component 102 based on image files 106. In some embodiments, system 100 includes a repair tool (not shown) configured to perform a maintenance operation for component 102.

In addition, in the exemplary embodiment, system 100 is configured to access a database 112 storing a plurality of image files 114. Each image file 114 includes, for example, a hash code, feature data, and image data. The hash code is an identification code used for data processing of image file 114. Feature data is file information that pertains to features of image file 114. Image data is file information that provides the visual representation of the image. In alternative embodiments, database 112 stores any files that enable system 100 to operate as described herein.

In some embodiments, controller 108 is configured to control one or more components of system 100 such as camera 104. Also, in the exemplary embodiment, controller 108 includes at least one memory 116 configured to store image files 106 captured by camera 104 and/or image files 114 retrieved from database 112, and at least one processor 118 configured to access memory 116 and database 112. In some embodiments, database 112 is stored in memory 116. In the exemplary embodiment, processor 118 may be programmed by encoding an operation using one or more executable instructions and providing the executable instructions in memory 116. In the exemplary embodiment, processor 118 is programmed to access image files 114 of database 112 and operate according to a retrieval module 120 to filter and sort image files 114. In particular, in some embodiments, controller 108 is configured to operate in accordance with retrieval module 120 to utilize metadata of image files 114 to filter and sort image files 114. In addition, in some embodiments, controller 108 is configured to generate inspection reports based on retrieved image files 114. Retrieval module 120 may be included in software or programming stored on memory 116, incorporated into processor 118, and/or stored at least partially on an external computing device. In alternative embodiments, system 100 includes any controller 108 that enables system 100 to operate as described herein. For example, in some embodiments, at least a portion of controller 108 is located remote from other components of system 100 and is configured to communicate with components of system 100 via a wired and/or unwired link.

Memory 116 may include any appropriate information storage device, including combinations of magnetic storage devices (e.g., a hard disk drive), optical storage devices, mobile telephones, and/or semiconductor memory devices. In the exemplary embodiment, memory 116 includes one or more devices that enable information, such as executable instructions and/or other data, to be stored and retrieved. Moreover, memory 116 includes one or more computer readable media, such as, without limitation, dynamic random access memory (DRAM), static random access memory (SRAM), a solid state disk, and/or a hard disk. In the exemplary embodiment, memory 116 stores, without limitation, application source code, application object code, configuration data, additional input events, application states, assertion statements, validation results, and/or any other type of data.

In the exemplary embodiment, retrieval module 120 utilizes a training process involving self-learning to increase the accuracy of the sorting and filtering processes for image files 114. As controller 108 retrieves image files 114, controller 108 learns from the retrieval processes using a deep convolutional neural network (CNN). Accordingly, the accuracy by which controller 108 sorts and filters image files 114 increases as controller 108 sorts and filters more image files 114. For example, in some embodiments, retrieval module 120 is configured to learn from the comparison of hash codes and the comparison of feature data to increase the accuracy of retrieval module 120 in retrieving the plurality of image files 114.

Figure 2:
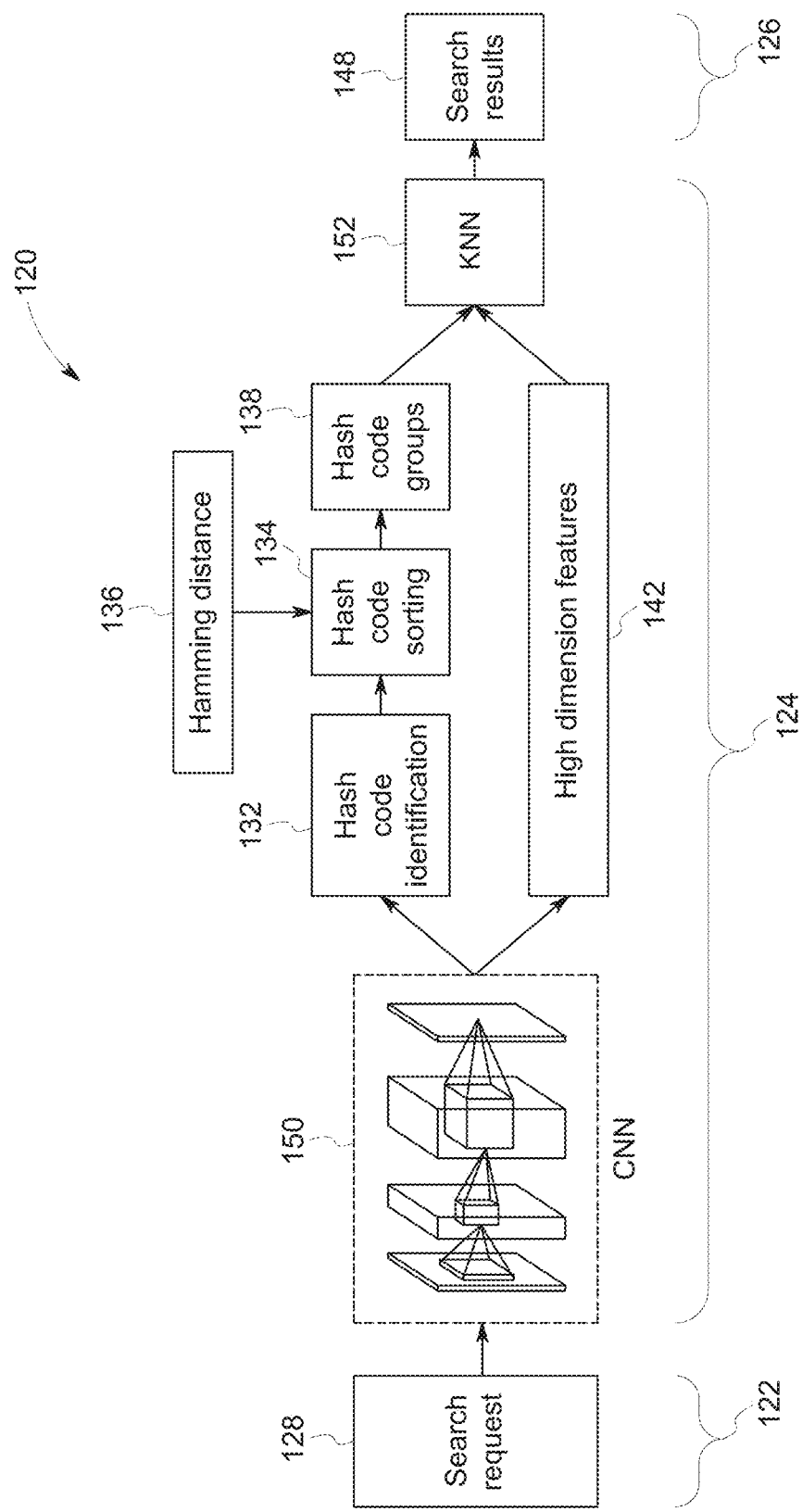
FIG. 2 is a schematic diagram of a retrieval module of the system shown in FIG. 1.
Figure 3:
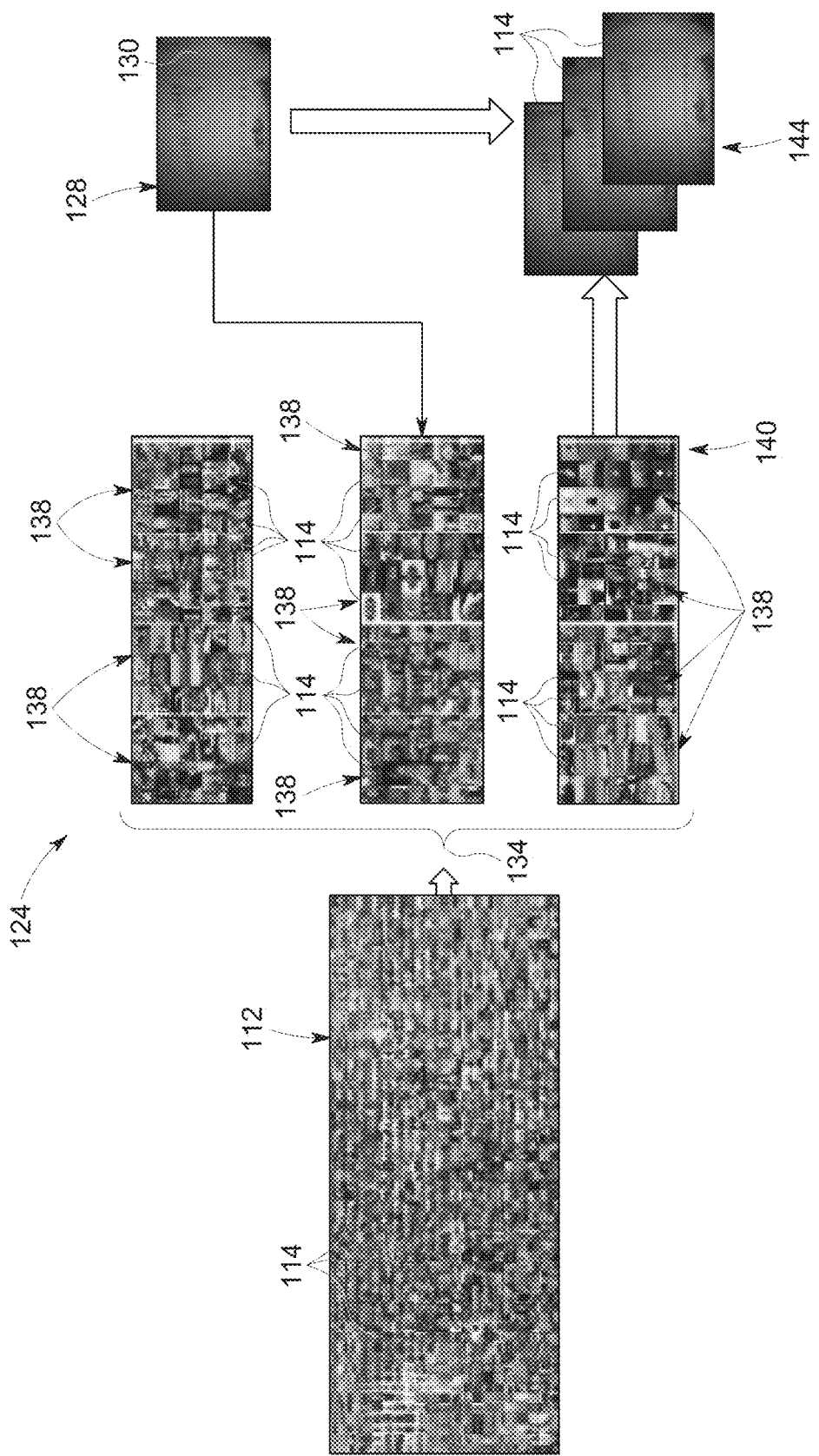
FIG. 3 is a schematic diagram of an image retrieval phase of the retrieval module shown in FIG. 3.

FIG. 2 is a schematic diagram of retrieval module 120 of system 100. FIG. 3 is a schematic diagram of an image retrieval phase 124 of retrieval module 120. In the exemplary embodiment, retrieval module 120 includes a query phase 122, an image retrieval phase 124, and a results phase 126. Phases 122, 124, and 126 may be performed sequentially in any order and/or performed at least partially simultaneously. In alternative embodiments, retrieval module 120 includes any phase that enables retrieval module 120 to operate as described herein.

In the exemplary embodiment, query phase 122 includes receiving a search request 128 based on at least one inspection image file 130. Each inspection image file 130 includes a hash code, feature data, and image data. Search request 128 may be received via user interface 110 (shown in FIG. 1). For example, in some embodiments, a user uploads or otherwise provides inspection image file 130 via user interface 110 (shown in FIG. 1) and user interface 110 generates search request 128 based on inspection image file 130. In further embodiments, the user may or may not input information in addition to or in place of inspection image file 130. In some embodiments, inspection image file 130 is generated using camera 104 (shown in FIG. 1). In further embodiments, inspection image file 130 is provided from an external source. Inspection image file 130 may be stored in memory 116 (shown in FIG. 1). Search request 128 may relate to a feature of component 102 (shown in FIG. 1) and/or a region of interest on image file 114. In alternative embodiments, retrieval module 120 receives any search request 128 that enables system 100 to operate as described herein.

Also, in the exemplary embodiment, retrieval phase 124 includes accessing database 112 which includes image files 114 and retrieving image files 114 based on search request 128. For example, in some embodiments, each image file 114 includes a hash code, feature data, and image data. In the exemplary embodiment, retrieval phase 124 includes identifying 132 hash codes of image files 114 and comparing the hash code of inspection image file 130 to the hash code of each image file 114. In some embodiments, retrieval module 120 is configured to sort image files 114 into groups 138 of image files 114 with similar or matching hash codes. The similar or matching hash codes may be determined using a hamming distance 136, e.g., a predefined range from a specified hash code value, such that each image file 114 in a respective group 138 has a hash code within a specified range. Accordingly, retrieval module 120 is configured to compare the hash code of inspection image file 130 to the hash code range of each group 138 to sort image files 114 in each group 138 at the same time. As a result, the time required to retrieve image files 114 that are potentially relevant for image file 114 is reduced in comparison to at least some known inspection systems.

Retrieval module 120 is configured to identify at least one first subset 140 of filtered image files 114 based on the comparison of hash codes. For example, in some embodiments, the particular hamming distance 136 between the hash code of inspection image file 130 and the hash code of each image file 114 in first subset 140 is less than a threshold value. In some embodiments, retrieval module 120 processes image files 114 in groups and first subset 140 includes image files 114 of one or more groups 138 with a hash code range that overlaps or is close to the hash code of inspection image file 130. As a result, retrieval module 120 provides a trimmed down or filtered first subset 140 of image files 114 that is simpler for retrieval module 120 to process in comparison to analyzing the entire database 112.

Moreover, in the exemplary embodiment, retrieval phase 124 includes comparing the feature data of at least one inspection image file 130 to the feature data of each image file 114 of first subset 140. For example, in some embodiments, retrieval module 120 identifies features of inspection image file 130 and features of each image file 114 of first subset 140. Also, retrieval module 120 compares high dimension features 142 of inspection image file 130 and image files 114 to determine similarities and differences between image files 130 and image files 114, and sorts first subset 140 based on the similarities and differences. For example, in some embodiments, retrieval module 120 measures distances between features and characterizes image files 114 based on the distances. In particular, retrieval phase 124 classifies image files 114 as relevant if the differences between the feature values of inspection image file 130 and image files 114 are less than a threshold value. Image files 114 that are classified as relevant are included in a second subset 144 of image files 114. In alternative embodiments, retrieval module 120 compares and classifies image files 114 in any manner that enables retrieval module 120 to function as described herein.

In some embodiments, retrieval module 120 is configured to analyze image data of image files 114 in second subset 144 of image files 114. Accordingly, retrieval module 120 only analyzes image data of image files 114 that have been classified as relevant during the retrieval process. For example, in some embodiments, retrieval module 120 compares the image data of inspection image file 130 to the image data of each image file 114 in second subset 144. In some embodiments, retrieval module 120 is able to identify and/or classify features and/or regions of interest in image file 114 at least partly autonomously by comparing image data of inspection image file 130 and image files 114.

In addition, in the exemplary embodiment, results phase 126 includes providing search results 148. In some embodiments, search results 148 include an inspection report based on the comparison of the image data of inspection image file 130 to the image data of each image file 114 in second subset 144, a list of second subset 144 of image files 114, historic inspection reports associated with inspection image file 130 and/or image files 114, and/or information related to at least one feature or at least one region of interest in the image data of inspection image file 130. For example, in some embodiments, the inspection reports highlights features and/or regions of interest in inspection image file 130 and provides recommendations or possible courses of action based on the identified features.

In addition, in some embodiments, retrieval module 120 includes CNN operations 150 or k-nearest neighbors (KNN) operations 152 that process information and "learn" during query phase 122, image retrieval phase 124, and/or results phase 126. In the exemplary embodiment, retrieval module 120 includes CNN operations 150 that utilize information from hash code comparison and feature data comparison to provide enhanced processing for image retrieval phase 124.

In addition, microservices are configured to facilitate communication for retrieval module 120 and other applications that interact with retrieval module 120. In alternative embodiments, retrieval module 120 includes and/or communicates using any computer services that enable retrieval module 120 to operate as described herein.

Figure 4:
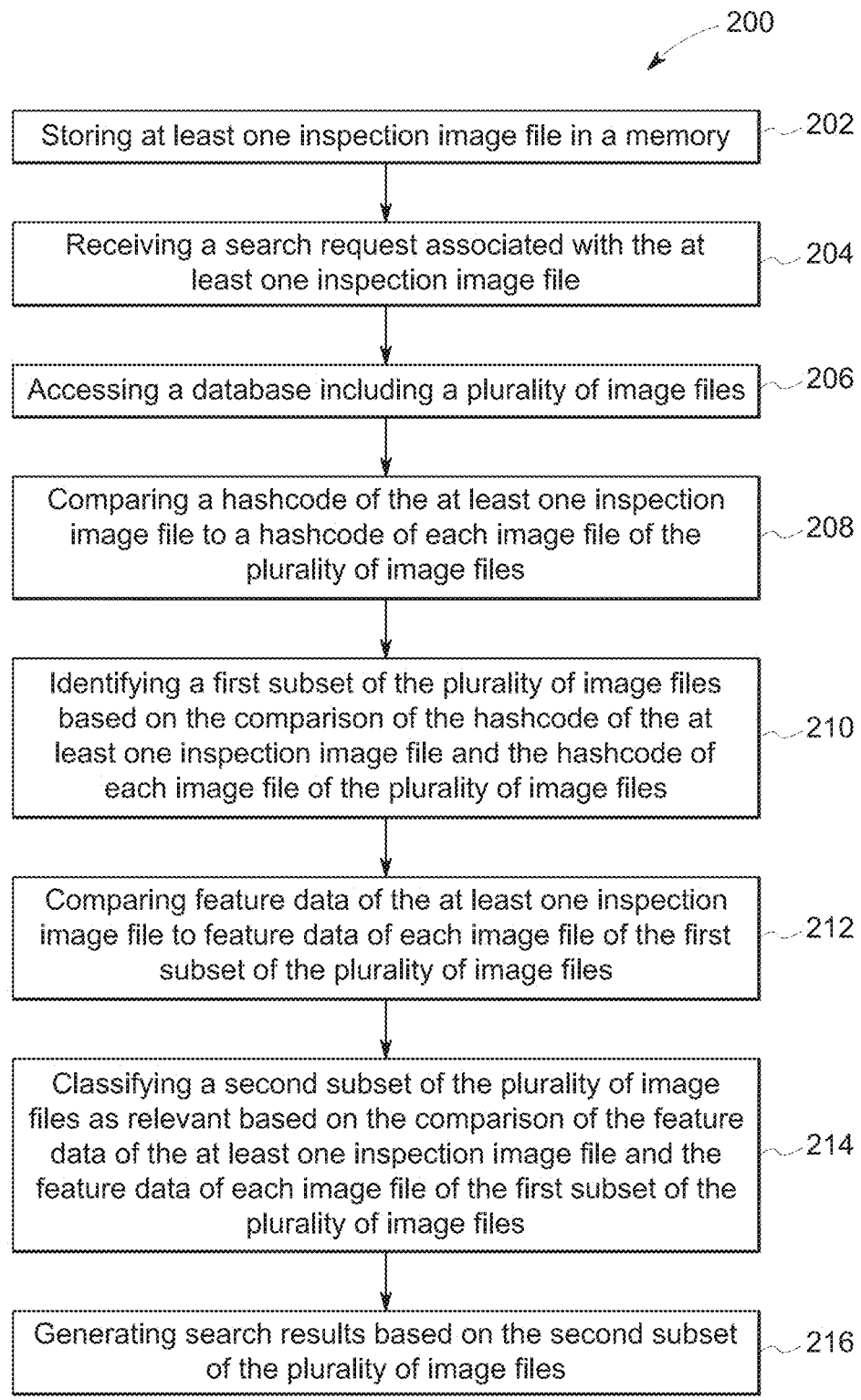
FIG. 4 is a flow diagram of an exemplary method for inspecting a component.

FIG. 4 is a flow diagram of an exemplary method 200 for inspecting a component. With reference to FIGS. 1-4, method 200 includes storing 202 at least one inspection image file 130 in memory 116 and receiving 204 search request 128 associated with inspection image file 130. For example, in some embodiments, search request 128 is received via user interface 110 and includes inspection image file 130. In further embodiments, retrieval module 120 analyzes inspection image file 130 to gather information for search request 128.

Also, in the exemplary embodiment, method 200 includes accessing 206 database 112 including image files 114. In some embodiments, database 112 is included at least partly on a remote system that retrieval module 120 is able to access. In further embodiments, database 112 is stored at least partly in memory 116 communicatively coupled to processor 118.

In addition, in the exemplary embodiment, method 200 includes comparing 208 the hash code of inspection image file 130 to the hash code of each image file 114 and identifying 210 first subset 140 of image files 114 based on the comparison of the hash code of inspection image file 130 and the hash code of each image file 114. For example, in some embodiments, retrieval module 120 determines hamming distances 136 between the hash code of inspection image file 130 and the hash code of each image file 114 and sorts image files 114 based on hamming distances 136. In further embodiments, hamming distances 136 are compared to a threshold value and image files 114 associated with a hamming distance 136 less than the threshold value are included in first subset 140. In some embodiments, image files 114 are sorted into groups 138 of image files 114 with similar or matching hash codes to simplify the hash code comparison process.

Also, in the exemplary embodiment, method 200 includes comparing 212 the feature data of inspection image file 130 to the feature data of each image file 114 and classifying 214 second subset 144 of image files 114 as relevant based on comparison 212. For example, in some embodiments, retrieval module 120 identifies features of inspection image file 130 and compares the features of inspection image file 130 and each image file 114 of first subset 140 to determine similarities and differences between inspection image file 130 and image files 114. For example, in some embodiments the distance between features in inspection image file 130 and image files 114 are measured. Image files 114 that resemble inspection image file 130 based on feature data are included in second subset 144 of image files 114.

Moreover, in the exemplary embodiment, method 200 includes generating 216 search results 148 based on second subset 144 of image files 114. In some embodiments, search results 148 includes a list of search results associated with inspection image file 130, an inspection report based on the comparison of inspection image file 130 and each image file in second subset 144 of image files 114, a list of second subset 144 of image files 114, historic inspection reports associated with image files 114, and/or information related to at least one feature or at least one region of interest in inspection image file 130.

In some embodiments, method 200 includes identifying at least one feature or at least one region of interest in the image data of inspection image file 130 using information from second subset 144 of image files 114. For example, in some embodiments, retrieval module 120 compares image data of inspection image file 130 to image data of image files 114 in second subset 144 to help identify features and/or regions of interest in inspection image file 130.

At least one technical effect of the systems and methods described herein includes: (a) decreasing retrieval time for image files in databases; (b) providing inspection and classification systems that are able to handle databases with extensive image files and historical data; (c) increasing the recognition accuracy and sensitivity of inspection and classification systems; (d) providing inspection and classification systems that are able to analyze inspection image files at least partly autonomously; and (e) increasing the amount and quality of relevant image files that inspection and classification systems are able to retrieve based on one or more inspection image files.

Exemplary embodiments of systems and methods of identifying features of a component are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of inspecting a component using an image inspection controller that includes a processor communicatively coupled to a memory and configured to operate in accordance with an image retrieval module, said method comprising:
    storing, using the processor, at least one inspection image file in the memory, the at least one inspection image file including a hash code, feature data, and image data;
    receiving, using the processor, a search request associated with the at least one inspection image file;
    accessing, using the processor, a database including a plurality of image files, each image file of the plurality of image files including a hash code, feature data, and image data;
    comparing, using the processor, the hash code of the at least one inspection image file to the hash code of each image file of the plurality of image files;
    identifying, using the processor, a first subset of the plurality of image files based on the comparison of the hash code of the at least one inspection image file and the hash code of each image file of the plurality of image files;
    comparing, using the processor, the feature data of the at least one inspection image file to the feature data of each image file of the first subset of the plurality of image files;
    classifying, using the processor, a second subset of the plurality of image files as relevant based on the comparison of the feature data of the at least one inspection image file and the feature data of each image file of the first subset of the plurality of image files; and
    generating, using the processor, search results based on the second subset of the plurality of image files.

2. A method in accordance with claim 1 further comprising operating at least one convolutional neural network to learn from the comparison of the hash codes and the comparison of the feature data and increase the accuracy of the retrieval module in classifying the plurality of image files.

3. A method in accordance with claim 1, wherein comparing the hash code of the at least one inspection image file to the hash code of each image file of the plurality of image files comprises determining hamming distances between the hash code of the at least one inspection image file and the hash code of each image file of the plurality of image files.

4. A method in accordance with claim 3 further comprising sorting the plurality of image files according to the hamming distances, wherein each image file in the first subset of the plurality of image files is associated with a hamming distance less than a threshold value.

5. A method in accordance with claim 1, wherein comparing the feature data of the at least one inspection image file to the feature data of each image file of the first subset of the plurality of image files comprises:
    identifying features of the at least one inspection image file and each image file of the first subset of the plurality of image files; and
    comparing the features to identify similarities between the at least one inspection image file and the first subset of the plurality of image files.

6. A method in accordance with claim 5 further comprising sorting the first subset of the plurality of image files according to the similarities between the first subset of the plurality of image files and the at least one inspection image file, wherein each image file in the second subset of the plurality of image files includes similar features to the at least one inspection image.

7. A method in accordance with claim 1, wherein receiving the search request for the database including the plurality of image files comprises generating, via a user interface, the search request for the database including the plurality of image files, the method further comprising displaying, via the user interface, the search results.

8. A method in accordance with claim 1, wherein generating the search results based on the second subset of the plurality of image files comprises providing a list of the second subset of image files and historic inspection reports associated with the second subset of image files.

9. A method in accordance with claim 1 further comprising identifying at least one feature or at least one region of interest in the image data of the at least one inspection image file, wherein generating the search results based on the comparison of the image data of the at least one inspection image file to the image data of each image file in the second subset of the plurality of image files comprises generating an inspection report including highlighting at least one feature or at least one region of interest in the image data of the at least one inspection image file.

10. A system for inspecting a component, said system comprising:
- at least one memory comprising a database storing a plurality of image files, each image file of the plurality of image files including a hash code, feature data, and image data; and
- at least one processor configured to access said at least one memory and operate in accordance with a retrieval module, wherein said at least one processor is programmed to:
  - store at least one inspection image file in the memory, the at least one inspection image file including a hash code, feature data, and image data;
  - receive a search request associated with the at least one inspection image file;
  - compare the hash code of the at least one inspection image file to the hash code of each image file of the plurality of image files;
  - identify a first subset of the plurality of image files based on the comparison of the hash code of the at least one inspection image file and the hash code of each image file of the plurality of image files;
  - compare the feature data of the at least one inspection image file to the feature data of each image file of the first subset of the plurality of image files;
  - classify a second subset of the plurality of image files as relevant based on the comparison of the feature data of the at least one inspection image file and the feature data of each image file of the first subset of the plurality of image files; and
  - generate search results based on the second subset of the plurality of image files.

11. A system in accordance with claim 10 further comprising a camera configured to capture the at least one inspection image file and provide the at least one image file to said processor.

12. A system in accordance with claim 10, wherein the retrieval module is configured to learn from the comparison of the hash codes and the comparison of the feature data to increase the accuracy of said processor in classifying the plurality of image files.

13. A system in accordance with claim 10, wherein said processor is programmed to compare the hash code of the at least one inspection image file to the hash code of each image file of the plurality of image files by determining hamming distances between the hash code of the at least one inspection image file and the hash code of each image file of the plurality of image files.

14. A system in accordance with claim 13, wherein said processor is further programmed to sort the plurality of image files according to the hamming distances, wherein each image file in the first subset of the plurality of image files is associated with a hamming distance less than a threshold value.

15. A system in accordance with claim 10, wherein said processor is further programmed to identify features of the at least one inspection image file and each image file of the first subset of the plurality of image files and compare the features to identify similarities between the at least one inspection image file and image files of the first subset of the plurality of image files.

16. A system in accordance with claim 15, wherein said processor is further programmed to sort the first subset of the plurality of image files according to the similarities between the first subset of the plurality of image files and the at least one inspection image, wherein each image file in the second subset of the plurality of image files includes features similar to the at least one inspection image.

17. A system in accordance with claim 10 further comprising a user interface configured to generate the search request based on a user input, and display the search results.

18. A non-transitory computer readable medium for identifying at least one feature in at least one image of a component, said non-transitory computer readable medium configured to cause a processor to: store at least one inspection image file in a memory, the at least one inspection image file including a hash code, feature data, and image data; receive a search request associated with the at least one inspection image file; access a database including a plurality of image files, each image file of the plurality of image files including a hash code, feature data, and image data; compare the hash code of the at least one inspection image file to the hash code of each image file of the plurality of image files; identify a first subset of the plurality of image files based on the comparison of the hash code of the at least one inspection image file and the hash code of each image file of the plurality of image files; compare the feature data of the at least one inspection image file to the feature data of each image file of the first subset of the plurality of image files; classify a second subset of the plurality of image files as relevant based on the comparison of the feature data of the at least one inspection image file and the feature data of each image file of the first subset of the plurality of image files; and generate search results based on the second subset of the plurality of image files.

19. A non-transitory computer readable medium in accordance with claim 18, wherein said non-transitory computer readable medium is configured to learn from the comparison of the hash codes and the comparison of the feature data to increase the accuracy of the processor in classifying the plurality of image files.

20. A non-transitory computer readable medium in accordance with claim 19, wherein said non-transitory computer readable medium is configured to cause the processor to sort the plurality of image files into groups based on the hash codes of the plurality of image files and compare the hash code of the at least one inspection image to a hash code value of each group.

* * * * *